(12) United States Patent
Zhang et al.

(10) Patent No.: US 9,857,854 B2
(45) Date of Patent: Jan. 2, 2018

(54) VOLTAGE REGULATOR AND METHOD OF CONTROLLING A VOLTAGE REGULATOR COMPRISING A VARIABLE INDUCTOR

(71) Applicant: Dell Products L.P., Round Rock, TX (US)

(72) Inventors: Kejiu Zhang, Round Rock, TX (US); Shiguo Luo, Austin, TX (US)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 15/056,524

(22) Filed: Feb. 29, 2016

(65) Prior Publication Data
US 2017/0248996 A1    Aug. 31, 2017

(51) Int. Cl.
G06F 1/00    (2006.01)
G06F 1/26    (2006.01)
H02M 3/158    (2006.01)

(52) U.S. Cl.
CPC ............. G06F 1/26 (2013.01); H02M 3/158 (2013.01)

(58) Field of Classification Search
CPC .................................. G06F 1/26; H02M 3/158
See application file for complete search history.

(56) References Cited

U.S. PATENT DOCUMENTS

| | | | |
|---|---|---|---|
| 5,343,381 A * | 8/1994 | Bolduc | H02M 5/08 307/105 |
| 7,999,520 B2 | 8/2011 | Luo et al. | |
| 8,917,074 B2 | 12/2014 | Luo et al. | |
| 2009/0231081 A1 | 9/2009 | Ikriannikov et al. | |
| 2014/0103718 A1 | 4/2014 | Lee et al. | |
| 2014/0125306 A1 | 5/2014 | Babazadeh et al. | |
| 2015/0002112 A1 * | 1/2015 | Tang | H02M 3/1584 323/271 |
| 2015/0113294 A1 | 4/2015 | Zhang et al. | |
| 2015/0370295 A1 | 12/2015 | Luo et al. | |
| 2016/0261186 A1 * | 9/2016 | Jiang | H02M 3/157 |

OTHER PUBLICATIONS

Sun et al., "Light-Load Efficiency Improvement for Buck Voltage Regulators", IEEE Transactions on Power Electronics, vol. 24, No. 3, Mar. 2009, 10 pgs.

* cited by examiner

Primary Examiner — Austin Hicks
(74) Attorney, Agent, or Firm — Egan, Peterman, Enders & Huston LLP.

(57) ABSTRACT

Disclosed herein are embodiments of an improved switching regulator and a method for controlling a switching regulator, for example, to meet stringent transient demand and high efficiency requirements over wide operating range without impacting system stability. According to one embodiment, the switching regulator may be a voltage regulator comprising a plurality of voltage regulator phases, each phase comprising a power stage operable to produce an output voltage for a transient load, and a driver stage coupled for driving the power stage based on a modulated input signal supplied to the driver stage. A variable inductor is included within the power stages in order to meet stringent transient demand and high efficiency requirements over a range of load conditions and operating set points. A power controller is coupled for controlling the modulated input signals supplied to the driver stages to compensate for changing output filter characteristics when the inductance of the variable inductors changes with changes in the load current.

21 Claims, 8 Drawing Sheets

VOLTAGE REGULATOR AND METHOD OF CONTROLLING A VOLTAGE REGULATOR COMPRISING A VARIABLE INDUCTOR

FIELD

This application relates to information handling systems, and more particularly to multi-phase voltage regulator (VR) circuitry and methods for controlling such circuitry.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that maybe configured to process, store, and communicate information and may include one or more computer systems, data storage systems, and networking systems.

An information handling system may include multiple transient loads, such as processors and memory, whose power requirements change during operation. A switching regulator, such as a direct current-to-direct current (DC-DC) voltage regulator (VR), may be used to provide power to the transient loads, increasing or decreasing the power output in response to load requirements. A central processing unit (CPU), for example, may operate at a particular voltage, but the power required by the CPU may fluctuate depending on the processing mode (e.g., sleep mode, active mode and boost mode) or the operations to be completed at a given time. When a power increase is required, the VR must increase the output current so that the system processor receives the additional power it requires, while maintaining a substantially constant output voltage. Likewise, when a power decrease is required, the VR must decrease the output current so that the system processor receives less power, while maintaining the output voltage.

A single-phase voltage regulator typically includes a controller, a driver and a power stage for generating and supplying power (e.g., an output current and a voltage) to a load. Some voltage regulators are capable of operating in multiple phases. In multi-phase voltage regulators, a driver stage and a power stage are combined to form one phase, and multiple instances of such phases are coupled in parallel to provide varying ranges of output current. During periods of high loads, the multi-phase voltage regulator may function with all phases in operation. For lighter loads, it may employ phase-shedding and operate with a reduced number of phases.

Each phase in a single-phase or multi-phase voltage regulator typically includes a high-side transistor and a low-side transistor, which are driven by corresponding drivers, and an inductor, which is coupled between the transistors for providing an output current to a load. The amount of output current (or "phase current") provided by each phase generally depends on the switch state of the high-side and low-side transistors and the inductance of the inductor.

Voltage regulators transfer power from an input source to the load by charging and discharging the inductor(s) in the power stage(s) during each switching cycle. The charging and discharging of the inductor causes an alternating current, referred to as a ripple current, to flow through the inductor(s). Although necessary for the voltage regulator to properly function, the inductor ripple current results in power losses in the inductor and in the switching transistors. During light load conditions (e.g., during a sleep mode or low-power state), the relative ripple current magnitude may be significant, resulting in significant power loss even when the voltage regulator is powering a light load. This is highly undesirable, especially in battery powered systems and devices where battery life is of great concern.

In some cases, the inductor ripple current may be reduced and power conversion efficiency may be improved by increasing the inductance of the inductor(s) in the power stage(s). However, increasing the inductance impairs the regulator's ability to respond to changing loads (i.e., degrades the regulator's transient response) by limiting the speed at which the regulator's output current magnitude can change. On the other hand, transient response may be improved by reducing the inductance of the inductor(s) in the power stage(s) at the expense of reduced power conversion efficiency.

There is a conflict in traditional voltage regulator design, especially with regard to inductor optimization, to meet both stringent transient demand and high efficiency requirements. This conflict is particularly problematic when designing voltage regulators for processors and other information handling resources that present large transient loads to the voltage regulator. In one example, a 165 W CPU configured for operating in turbo boost mode may require a maximum load current (ICC) step up to about 187 A. In order to ensure adequate power delivery at high current loads, the voltage regulator design is forced to use a smaller inductance. Unfortunately, a smaller inductance results in large inductor current ripple in both pulse frequency modulation (PFM) and continuous conduction mode (CCM) operation, which reduces the system power conversion efficiency. Although a larger inductance would improve the power conversion efficiency, it impedes the di/dt current slew rate in load transient scenarios, which creates undesirable voltage excursion and jeopardizes system reliability.

One solution for meeting both transient demand and high efficiency requirements is to include a non-linear or variable inductor (i.e., an inductor whose inductance varies with drive current) in the VR power stage(s). This enables the inductance of the variable inductor to be increased to reduce inductor current ripple during light load conditions, and decreased to increase the current slew rate during load transients. Although various types of non-linear and variable inductors have been used for such purposes, the changing inductance value adversely affects the system stability.

SUMMARY

The following description of various embodiments of information handling systems, voltage regulators and methods for controlling a voltage regulator is not to be construed in any way as limiting the subject matter of the appended claims.

Provided herein are improved switching regulators and methods for controlling a switching regulator, so as to meet stringent transient demand and high efficiency requirements over the operating range without impacting system stability. Although described herein in the context of a voltage regulator, and more specifically, a DC-to-DC voltage regulator, the concepts described herein may be applied to substantially any switching regulator or switching power supply known in the art.

According to one embodiment, a voltage regulator is provided herein comprising a plurality of voltage regulator phases, which are coupled for producing an output voltage for a transient load. In general, each voltage regulator phase comprises a power stage coupled for generating a phase current, and a driver stage coupled for driving the power stage based on a modulated input signal supplied to the driver stage. Each power stage generates a phase current based on a supply voltage supplied to the power stage and the modulated input signal supplied to a respective driver stage.

According to one embodiment, each power stage comprises a high-side switch and a low-side switch coupled in series between the supply voltage and ground, and an output inductor, which is coupled in parallel to the high-side switch and the low-side switch for generating the phase current. The modulated input signal supplied to the driver stage determines how long the high-side and low-side switches are turned on, respectively, during each cycle of the modulated input signal, and therefore, the amount of phase current generated by each power stage.

In order to meet stringent transient demand and high efficiency requirements over a wide range of load conditions, the output inductor may be implemented as a variable inductor, i.e., an inductor whose inductance value changes with changes in load current and operating set-point. The variable inductor may comprise substantially any type of non-linear inductor or variable inductor known in the art. Use of a variable inductor in the power stages improves the voltage regulator's power conversion efficiency at light loads without significantly impairing the regulator's transient response, and vice versa.

In one embodiment, the voltage regulator described herein may further comprise an output filter, which is coupled between an output of the voltage regulator phases and the transient load to provide an output voltage with a constant amplitude. According to one embodiment, the output filter may include the variable inductors included within the power stages and at least one capacitor. When load conditions change (e.g., when transitioning from a light load condition to a heavier load condition, or vice versa), the inductance of the variable inductors changes, which causes characteristics of the LC output filter to change. Without properly compensating for changing LC output filter characteristics, the variable inductance provided by the variable inductors tends to introduce a lot of jittering and instability into the system.

Therefore, an improved power controller may be provided within the voltage regulator for controlling the modulated input signals supplied to the driver stages to compensate for the changing output filter characteristics when the inductance of the variable inductors changes with changes in the load current. Generally speaking, the improved power controller may be configured for controlling the modulated input signals supplied to the driver stages based, at least in part, on the phase currents generated by the power stages, the number of voltage regulator phases, the output voltage produced by the voltage regulator phases and a voltage identification ("VID") command received from the transient load.

According to one embodiment, the power controller comprises an Adaptive Voltage Positioning (AVP) module, a digital compensator and Pulse Width Modulator (PWM). In general, AVP module is coupled for receiving the output voltage, the VID command, and a sum of the phase currents generated by the power stages, and is configured for decoding the VID command, determining a target voltage based on the decoded VID command and the sum of the phase currents, and generating an error signal based on a difference between the output voltage and the target voltage. The digital compensator implements a transfer function for filtering the error signal generated by the AVP module to produce an output signal, which is supplied to the PWM. In this manner, the output signal may be used for adjusting at least one of a pulse frequency and a pulse width of the modulated input signals supplied to the driver stages.

According to one embodiment, the digital compensator may include a proportional-integral-derivative ("PID") filter, which is configured to implement the transfer function, and a memory, which is configured for storing a plurality of sets of PID filter coefficients, wherein such sets differ depending on phase current and phase number. In some embodiments, the plurality of sets of PID filter coefficients may be stored within the memory in a three-dimensional matrix having x, y and z axes, wherein the x axis corresponds to the phase number, the y axis corresponds to the phase current and the z axis is a function of x and y. In other embodiments, the plurality of sets of PID filter coefficients may be stored within the memory in one or more two-dimensional look-up tables, which receive phase current and phase count information as inputs and return a corresponding set of PID filter coefficients.

During operation, the digital compensator may retrieve a particular set of PID filter coefficients from the memory based on the sum of the phase currents generated by the power stages and the number of the voltage regulator phases, and input the retrieved set of PID filter coefficients to the transfer function to produce the output signal. By dynamically adjusting the PID filter coefficients based on the current phase current and phase count information, the digital compensator improves system stability by compensating for changes in LC output filter characteristics. In particular, the dynamic compensation provided by the digital compensator may improve system stability by increasing the phase margin during light load conditions.

An information handling system is also provided herein. In general, the information handling system may include at least one information handling resource operable for producing a transient load, and at least one voltage regulator coupled to the at least one information handling resource for producing an output voltage for supplying the transient load. The at least one voltage regulator may be configured, as described above.

An improved method for controlling a voltage regulator is also provided herein. The voltage regulator may be generally configured, as described above. As such, the voltage regulator may comprise a plurality of voltage regulator phases coupled for producing an output voltage for a transient load, and an output filter coupled between an output of the voltage regulator phases and the transient load. Each voltage regulator phase may comprise a driver stage and a power stage, and each power stage may include a variable inductor whose inductance changes with changes in load current. In some embodiments, the output filter may include the variable inductors included within the power stages and at least one capacitor.

According to one embodiment, the improved method may include driving the power stages based on modulated input signals supplied to the driver stages, generating a phase current at each power stage based on a supply voltage supplied to the power stage and the modulated input signal supplied to a respective driver stage, and controlling the modulated input signals supplied to the driver stages to compensate for changing output filter characteristics when the inductance of the variable inductors changes with changes in the load current.

According to one embodiment, the step of controlling may comprise controlling the modulated input signals supplied to the driver stages based, at least in part, on the phase currents generated by the power stages, the number of voltage regulator phases, the output voltage produced by the voltage regulator phases and a voltage identification ("VID") command received from the transient load. For example, the step of controlling may comprise decoding the VID command, determining a target voltage based on the decoded VID command and a sum of the phase currents generated by the power stages, and generating an error signal based on a difference between the output voltage and the target voltage. In addition, the step of controlling may comprise utilizing a transfer function for filtering the error signal to produce an output signal, and using the output signal for adjusting at least one of a pulse frequency and a pulse width of the modulated input signals supplied to the driver stages.

According to one specific embodiment, the step of utilizing a transfer function may include implementing the transfer function as a proportional-integral-derivative ("PID") transfer function comprising a set of coefficients, which may be dynamically updated or adjusted based on current phase current and phase count information. For instance, and as noted above, a plurality of sets of the coefficients may be predetermined and stored within memory, e.g., within a three-dimensional matrix or one or more two-dimensional look up tables. The sets of coefficients stored within the memory differ depending on phase current and phase number. According to one embodiment, a set of coefficients used within the PID transfer function may be dynamically adjusted by retrieving a particular set of coefficients from the memory based on the sum of the phase currents generated by the power stages and the number of the voltage regulator phases, and inputting the retrieved set of coefficients to the transfer function to produce the output signal.

BRIEF DESCRIPTION OF THE DRAWINGS

Other advantages of the invention will become apparent upon reading the following detailed description and upon reference to the accompanying drawings in which.

Figure 1:
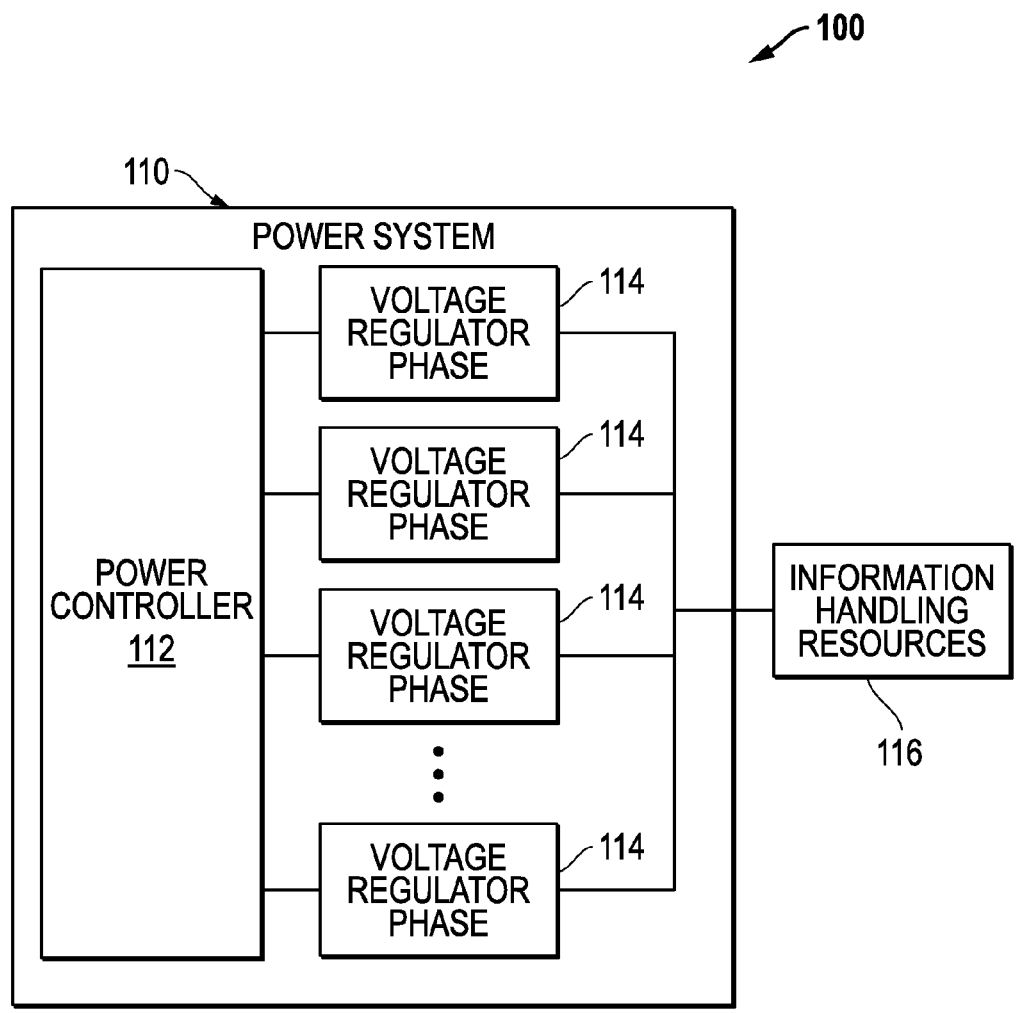
FIG. 1 is a simplified block diagram illustrating one example of an information handling system comprising a power system and one or more information handling resources.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF ILLUSTRATIVE EMBODIMENTS

FIG. 1 is a block diagram illustrating one example of an information handling system 100 incorporating a power system 110 in accordance with an embodiment of the present disclosure. Power system 110 may be described as a switching power supply, a switched-mode power supply, a switching regulator, a DC-to-DC converter, or a voltage regulator or a voltage converter. Generally speaking, switching power supplies convert power from one form to another by periodically cycling one or more switches (e.g., transistors) between fully on and fully off positions. Linear power supplies, on the other hand, convert power by operating one or more transistors in their linear region, as opposed to their fully on and fully off positions. Switching power supplies offer a number of advantages over linear power supplies including, but not limited to, higher efficiency and/or smaller size. Although a multi-phase buck converter is illustrated in the exemplary embodiments described herein, the inventive concepts may be applied to substantially any switching power supply architecture including a buck, boost, buck-boost, flyback, push-pull, half-bridge, full-bridge and SEPIC (single-ended primary-inductor converter).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

As depicted in FIG. 1, information handling system 100 may generally include a power system 110 and one or more other information handling resources 116. The information handling resources 116 may include any component system, device or apparatus of information handling system 100, including without limitation processors, busses, computer-readable media, input-output devices and/or interfaces, storage resources, network interfaces, motherboards, electro-mechanical devices (e.g., fans), displays, and/or power supplies.

Generally speaking, power system 110 may include any system, device, or apparatus configured to supply power (i.e., output current and/or voltage) to one or more information handling resources 116. In the illustrated embodiment, power system 110 is a multi-phase DC-to-DC voltage regulator, and more specifically, a multi-phase buck converter comprising a power controller 112 and a plurality of voltage regulator phases 114. However, power system 110 is not limited to including a multi-phase buck converter, and may include a single phase voltage regulator or another switching power supply topology (e.g., a boost, buck-boost, flyback, push-pull, half-bridge, full-bridge or SEPIC), as discussed above.

Generally speaking, power controller 112 may include any system, device, or apparatus, which is configured to control the output of power system 110 and/or selectively enable and disable the voltage regulator phases 114. For example, power controller 112 may be configured to selectively enable and disable one or more of the voltage regulator phases 114 in response to a current requirement of the information handling resources 116, such that one or more phases may be shed to reduce power consumption of power system 110 in response to a reduced current requirement, and thus increase power efficiency of information handling system 100. As described in more detail below, power controller 112 may be additionally configured for controlling the voltage regulator phases 114, so as to meet stringent transient demand and high efficiency requirements over the voltage regulator operating range without impacting system stability.

Generally speaking, each voltage regulator phase 114 may include any system, device, or apparatus, which is configured to supply a portion of the total current output of power system 110. In embodiments in which power system 110 is a multi-phase voltage regulator, each voltage regulator phase 114 comprises one phase of the voltage regulator.

Figure 2:
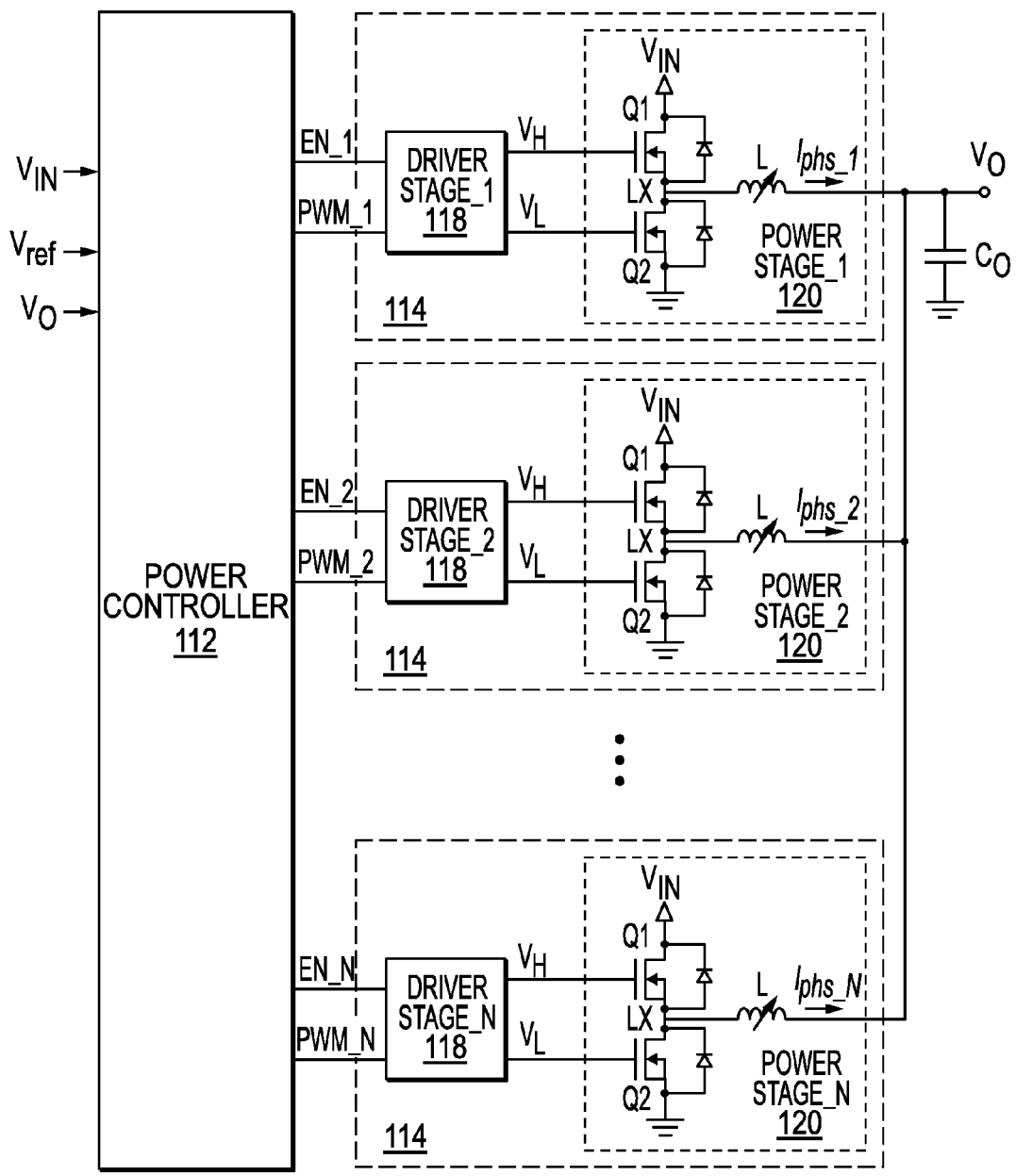
FIG. 2 is a simplified block diagram illustrating one embodiment of an exemplary power system comprising a power controller, a plurality of voltage regulator phases, and an output filter, wherein each phase comprises a driver stage and a power stage comprising a variable inductor.

FIG. 2 illustrates a block diagram of an exemplary power system 110, in accordance with embodiments of the present disclosure. In a multi-phase voltage regulation system, power controller 112 is coupled for controlling a plurality (N) of voltage regulator phases 114, each being coupled in parallel between the power controller 112 and one or more loads (such as information handling resources 116 of FIG. 1). Each voltage regulator phase 114 generally comprises a driver stage 118 and a power stage 120. When enabled, each driver stage 118 provides signals for alternately charging and discharging an inductor (L) included within a respective power stage 120, wherein such charging and discharging generates an alternating current (referred to as a ripple current) for supplying a load. An output filter, generally comprising a capacitor ($C_O$) or a bank of parallel coupled capacitors, is coupled between the output of the power stages 120 and the load to provide an output voltage ($V_O$) with a constant amplitude.

In the exemplary embodiment shown in FIG. 2, power controller 112 is coupled for supplying an enable signal (EN) and a modulated input signal (such as pulse-width modulation, PWM, signal) to each of the voltage regulator phases 114. The EN signal indicates whether a particular voltage regulator phase 114 is enabled or disabled, and the PWM signal provides a modulated pulse frequency and/or a modulated pulse width to the phases 114 for generating a desired voltage regulator output voltage ($V_O$). As described in more detail below, the PWM signals supplied to each of the driver stages 118 may be generated based on a difference between the output voltage ($V_O$) and a reference voltage (Vref) provided to the voltage regulator, as well as a supply voltage ($V_{IN}$) coupled to power stages 120. In some embodiments, the reference voltage may correspond to a voltage identification (VID) command associated with a particular load. The VID command determines the regulator set-point, i.e., the target voltage of the voltage regulator when the load current is zero.

In some embodiments, power controller 112 may vary the switching frequency of the PWM signal based on the load. For example, power controller 112 may operate in a continuous conduction mode (CCM) that maintains a continuous current in the inductor (L) by maintaining the switching frequency of the PWM signal whenever the load current is above a threshold (e.g., a transitional load point, as discussed below). When the load current is below a threshold (e.g., the transitional load point), power controller 112 may operate in a discontinuous conduction mode (DCM), or a pulse frequency modulation (PFM) mode, in which the switching frequency is changed to generate periods of zero inductor current in between charging and discharging of the inductor (L). The DCM (or PFM) may be used to supply power to a light load (such as during a sleep mode), whereas the CCM may be used to supply power during active and heavy load conditions.

Although not shown in the block diagram of FIG. 2, each driver stage 118 may generally include high-side driver and low-side driver. The high-side driver may generate a voltage ($V_H$) that regulates current through a high-side switch (Q1) of a respective power stage 120. Similarly, the low-side driver may generate a voltage ($V_L$) that regulates current through a low-side switch (Q2) of a respective power stage 120. The high-side and low-side drivers are controlled by the PWM signals respectively provided to the driver stages 118 by the power controller 112. Each cycle of a PWM signal has an on-portion and an off-portion. In one embodiment, the high-side switch (Q1) may be turned on, and the low-side switch (Q2) may be turned off, during the on-portion of each PWM cycle. Conversely, the low-side switch (Q2) may be turned on, and the high-side switch (Q1) may be turned off, during the off-portion of each PWM cycle. The duty cycle of the PWM signal determines how long the high-side and low-side switches are turned on, respectively, during each PWM cycle, and therefore, the amount of current ($I_{phs\_1} \ldots I_{phs\_N}$) provided by each voltage regulator phase 114 to the load.

According to one embodiment, each power stage 120 comprises a high-side switch (Q1) and a low-side switch (Q2), which are coupled in series between a supply voltage ($V_{IN}$) and ground, and an output inductor (L) coupled in parallel between the switches Q1 and Q2 for generating a phase current (Iphs). The high-side switch Q1 may comprise any suitable switching device (e.g., a metal-oxide-semiconductor field-effect transistor or "MOSFET") located between a positive terminal of the supply voltage ($V_{IN}$) and a load, while the low-side switch Q2 may comprise any suitable switching device (e.g., a MOSFET) located between the load and a negative terminal of the power supply or ground. A phase node voltage (LX) is generated between the switches Q1 and Q2 based on the supply voltage ($V_{IN}$) and the switch state of switches. The output inductor L is coupled between the phase node LX and the output of the voltage regulator for generating a phase current (Iphs), which may serve to boost or reduce the supply voltage ($V_{IN}$) to generate the output voltage ($V_O$). As noted above, the duty cycle of the PWM signal supplied to each driver stage 118 determines how long the high-side Q1 and low-side Q2 switches are turned on, respectively, during each PWM cycle. Thus, the duty cycle determines the amount of phase current ($I_{phs\_1} \ldots I_{phs\_N}$) provided by each voltage regulator phase 114 to the load.

According to one embodiment, the output inductor L is preferably implemented with a non-linear inductor or a variable inductor to minimize or avoid the trade-offs between transient response and power conversion efficiency, as discussed above. Specifically, a non-linear inductor or a variable inductor may be used within one or more of the voltage regulator phases 114 in place of an inductor having relatively constant inductance, for example, to: (a) improve the voltage regulator's power conversion efficiency at light loads without significantly impairing the regulator's transient response, and/or (b) improve the regulator's transient response without significantly impairing the regulator's efficiency at light load.

Figure 3:
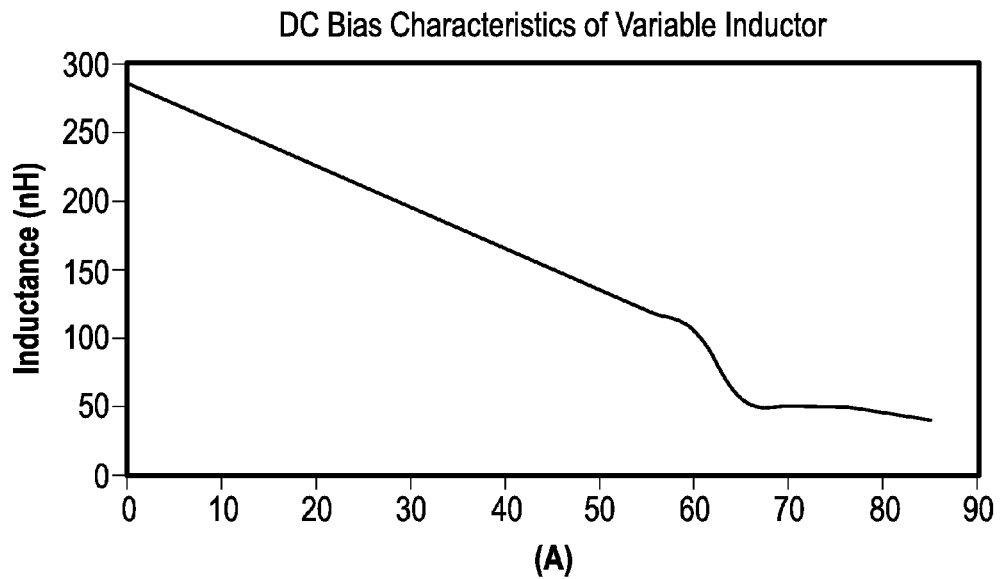
FIG. 3 is a graph illustrating how the inductance of a variable inductor generally decreases as the magnitude of its winding current increases, and vice versa.

As used herein, a variable inductor may comprise any type of non-linear inductor or variable inductor known in the art. According to one embodiment, a variable inductor whose inductance value varies according to the magnitude of the current flowing through its windings may be used in one or more of the power stages 120. As shown in the graph of FIG. 3, the inductance of a variable inductor generally decreases as the magnitude of its winding current increases. Thus, a variable inductor typically provides a relatively large inductance when the magnitude of its winding current is small, and a relatively small inductance when the magnitude of its winding current is large. The use of a variable inductor within one or more of the power stages 120 provides many advantages over an inductor with fixed inductance, as shown and described in more detail below.

Figure 4:
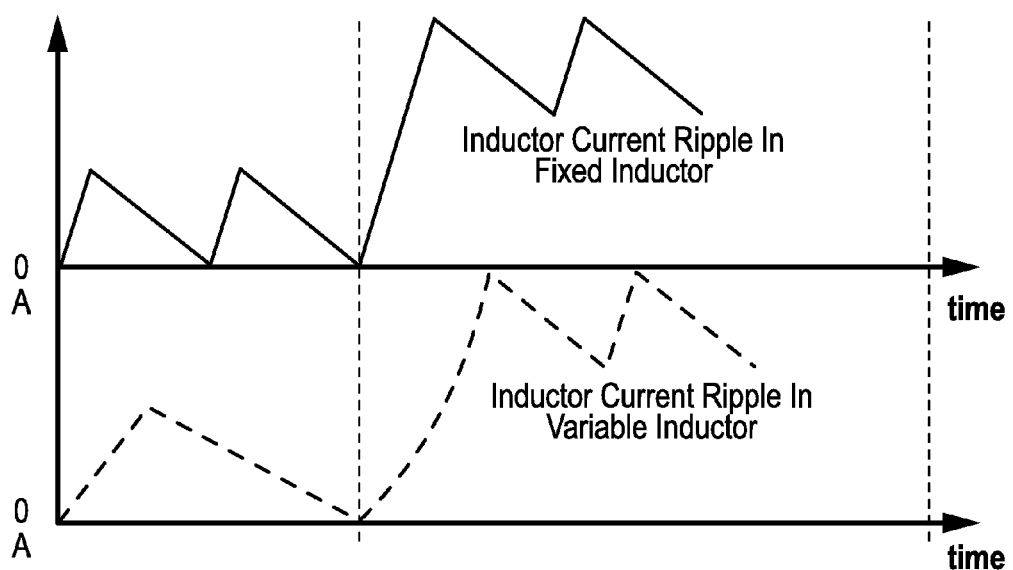
FIG. 4 is a graph comparing the current ripple generated in a linear inductor and a variable inductor operating in accordance with a pulse frequency modulation (PFM) control scheme over a range of load conditions.

FIG. 4 is a graph comparing the current ripple generated in a linear inductor and a variable inductor operating in accordance with a pulse frequency modulation (PFM) control scheme over a range of load conditions. As shown in FIG. 4, the variable inductor generates significantly less current ripple in the light load range, compared to the linear inductor, causing the voltage regulator switching frequency to slow down by a ratio of $L_{variable}/L_{linear}$. As noted above, reducing the inductor current ripple is beneficial in the light load range since it increases the power conversion efficiency of the voltage regulator. After the transitional load point, the CCM control scheme can be configured to maintain the same current ripple in both inductors, thus, maintaining a similar transient response for both linear and variable inductors at higher current loads.

Figure 5:
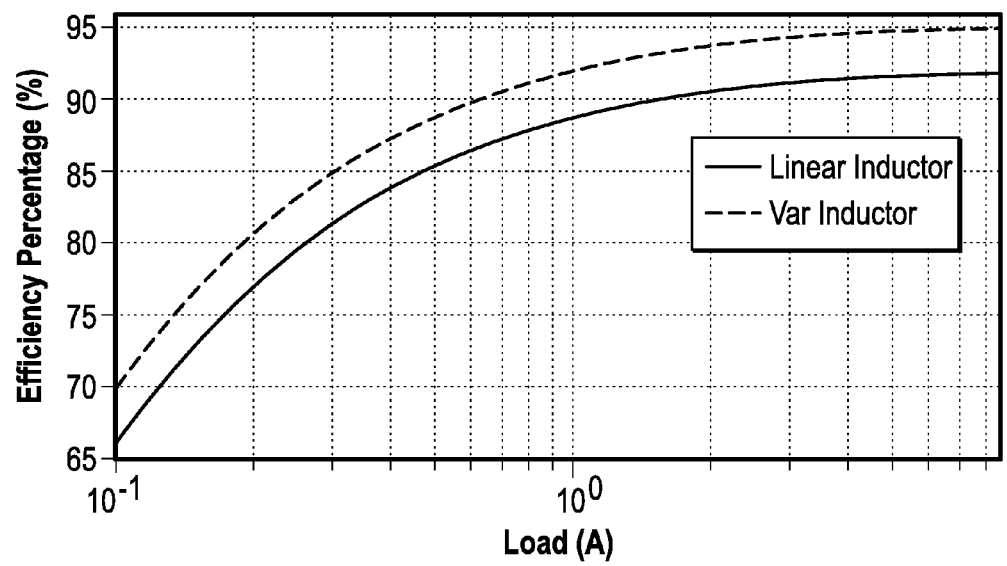
FIG. 5 is a graph comparing the power conversion efficiency of a linear inductor and a variable inductor in a light load range.
Figure 6:
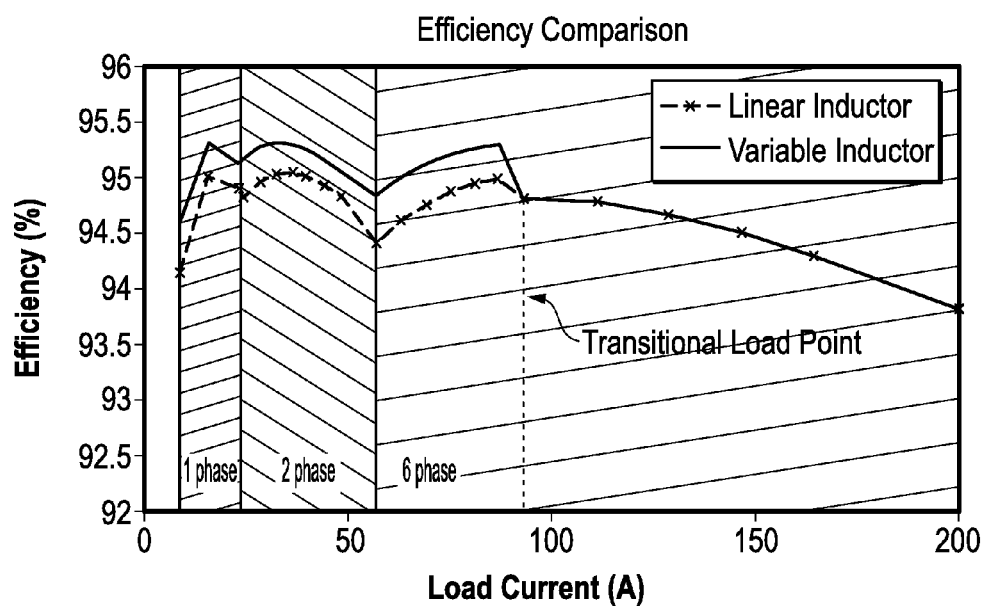
FIG. 6 is a graph comparing the power conversion efficiency of a linear inductor and a variable inductor in mid to heavy load ranges.

FIGS. 5-6 are graphs comparing the power conversion efficiency of a linear inductor and a variable inductor over a range of load conditions and operational modes. In particular, FIG. 5 shows, in logarithmic scale, a simulated efficiency comparison between a linear inductor and a variable inductor in a light load range. FIG. 6 illustrates an efficiency comparison in mid to heavy load ranges between a linear inductor and a variable inductor operating in CCM and incorporating phase shedding.

It is well known that when operating in DCM/PFM mode at light load, the voltage regulator power loss is dominated by switching losses, which includes high-side (HS) turn-off loss, HS/LS Output Capacitance loss, Gate driver loss, and Dead-Time Loss (HS falling). FIG. 5 shows that by using a variable inductor, as opposed to a linear inductor, a constant efficiency boost is gained in the light load range and approximately 560 mW of power saving is obtained at 8 A (at the far right of the graph). As shown in FIGS. 5-6, use of a variable inductor in lieu of a linear inductor provides a constant efficiency boost in the full light load range (e.g., about 0-90 A) up to the transitional load point. The transitional load point shown in FIG. 6 is the thermal design current (TDC) divided by the number of voltage regulator phases 114 (e.g., TDC/N), and represents the load point for transitioning from light load to active or heavy load conditions. FIG. 6 further illustrates approximately 650 mW of power saving is obtained at TDC (approx. 90 A, in this example) by using a variable inductor in the power stages. As the inductance value of the variable inductor approaches that of the linear inductor, the efficiency curves converge at the transitional load point. However, the comparisons shown in FIGS. 5-6 demonstrate that a total power saving of about 2.5 W can be obtained in a voltage regulator comprising 24 phases (Vcore & VDDQ). Such power saving is significant and is highly desirable in many applications. Unfortunately, including a variable inductor in the power stages 120 tends to create unwanted system behavior, as explained in more detail below.

Figure 7:
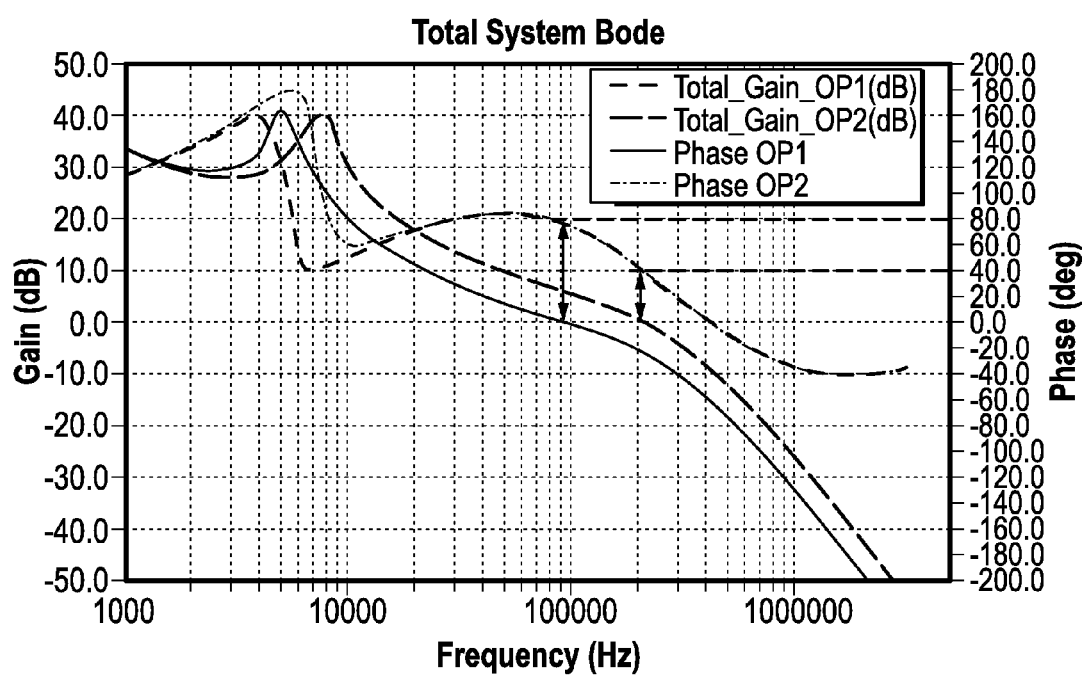
FIG. 7 is a Bode plot illustrating the total system gain for a voltage regulator having a power controller that does not compensate for changes in LC output filter characteristics when the inductance of the variable inductors changes with changes in the load current.
Figure 8:
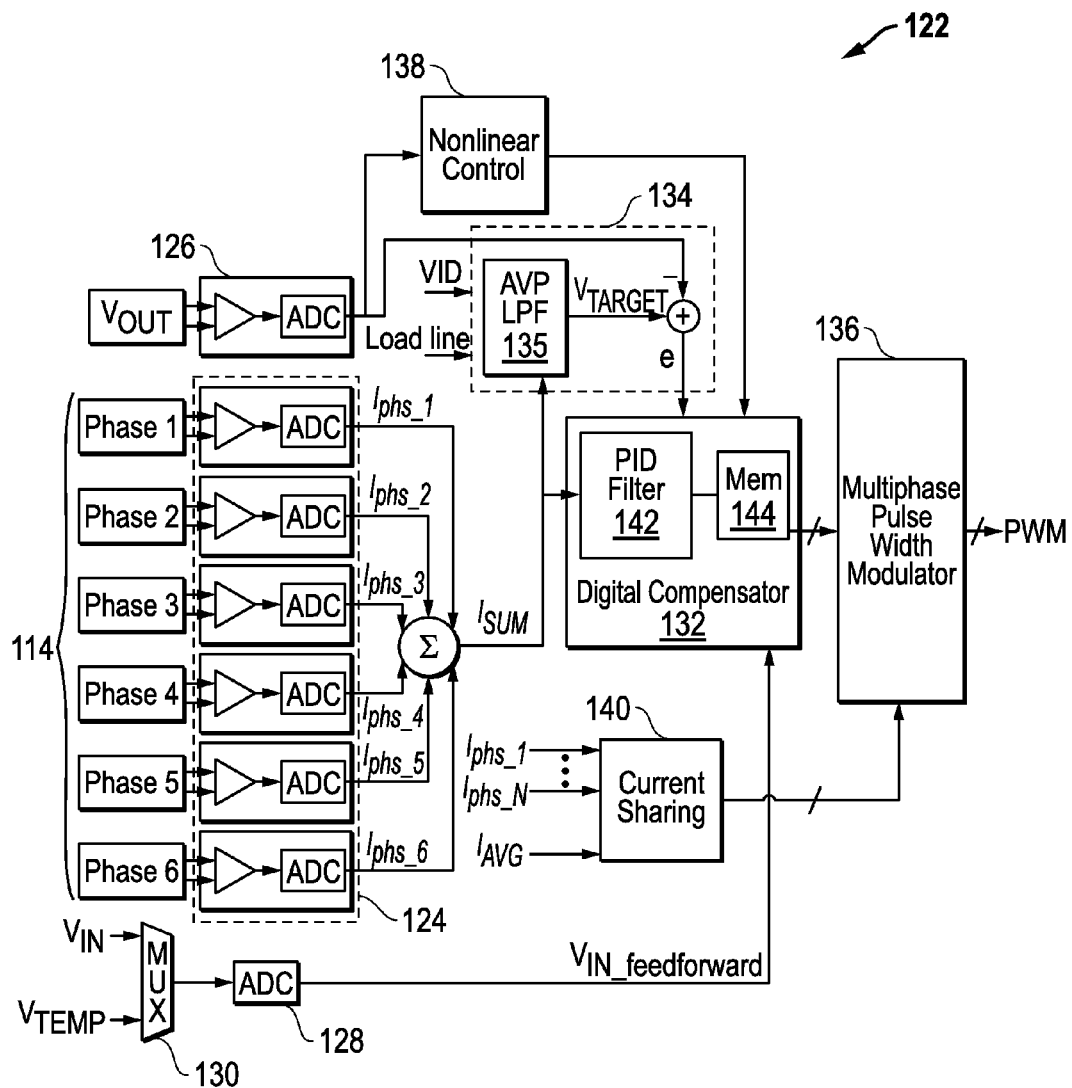
FIG. 8 is a simplified block diagram illustrating certain components of a power controller, which compensates for changes in LC output filter characteristics when the inductance of the variable inductors changes with changes in the load current.

FIG. 7 is a Bode plot for a voltage regulator, which includes variable inductors within the power stages 120, but implements control loop compensation for only one LC output filter configuration (i.e., for an LC output filter having a fixed inductance value and a fixed capacitance value). The Bode plot shown in FIG. 7 illustrates the total system Gain (in dB) and the phase (in degrees) that may be generated by such a voltage regulator when operating at two different load conditions. In FIG. 7, operating set-point 1 (OP1) corresponds to a relatively light load condition, and operating set-point 2 (OP2) corresponds to a relatively heavier load. The Total System Gain plotted in FIG. 7 is determined by:

$$\text{Gain}_{Total\ System} = \text{Gain}_{Compensator} \times \text{Gain}_{Open\ Loop} \qquad \text{EQ. 1,}$$

where Gain$_{Compensator}$ is the compensator gain and Gain$_{Open\ Loop}$ is the open loop gain of the PWM modulator and LC output filter stage (see, e.g., FIGS. 2 and 8).

Including a variable inductor in the power stages 120 inherently changes characteristics of the LC output filter when the value of the inductance changes between two different operating set-points (such as OP1 and OP2). As shown in FIG. 7, for example, the changing inductance between OP1 and OP2 causes a phase shift in the frequency domain transfer function, which doubles the system bandwidth and reduces the phase margin to half (e.g., from about 80 degrees to about 40 degrees). Without properly compensating for changing LC output filter characteristics, the variable inductance value provided by the variable inductor introduces a lot of jittering and instability into the system.

An improved power controller and compensation method is needed when using variable inductors within a voltage regulator design. As described in more detail below, the improved power controller and compensation method described herein improves system stability in voltage regulators comprising variable inductors (or other variant characteristics) by dynamically compensating the voltage regulator against changes in LC output filter characteristics over a wide range of operating set-points and load conditions.

FIG. 8 is a simplified block diagram illustrating certain components of an improved power controller 122, according to one embodiment of the invention. In one embodiment, power controller 122 may replace power controller 112 in the power system 110 of FIGS. 1 and 2 to control the operation of voltage regulator phases 114 by adjusting at least one of a pulse frequency and a pulse width of the modulated input signals supplied to the driver stages 118, or power controller 122 may be alternatively implemented in any other suitable power control architecture or environment to control at least one of pulse frequency and pulse width of one or more power stages. One skilled in the art would understand that although certain components are shown in FIG. 8 for the purpose of illustrating the claimed functionality of the improved power controller and compensation method described herein, other components not explicitly shown in FIG. 8 may also be included. One skilled in the art would also understand that although power controller 122 is shown and described as being coupled for controlling six voltage regulator phases (Phase 1 . . . Phase 6) 114, the improved power controller and compensation method described herein may be alternatively configured for controlling substantially fewer or more voltage regulator phases than explicitly shown and described herein.

Similar to the power controller 112 shown in FIG. 2, improved power controller 122 is coupled for receiving the output voltage (V$_{OUT}$) generated by a plurality of voltage regulator phases 114 (e.g., Phase 1 . . . Phase 6), a voltage identification (VID) command associated with a particular load and a supply voltage (V$_{IN}$). The power controller 122 is additionally coupled for receiving a phase current from each of the voltage regulator phases 114. As shown in FIG. 8, each phase current is individually sampled and digitized by an analog-to-digital converter (ADC) module 124 to produce a plurality of digitized phases (Iphs_1 . . . Iphs_6), which are summed to generate a digitized total phase current value (I$_{SUM}$). The output voltage (V$_{OUT}$) provided by the voltage regulator phases 114 is digitized by ADC 126, and at least one supply voltage (V$_{IN}$) is digitized by ADC 128. In some embodiments, a voltage (V$_{TEMP}$) corresponding to a temperature of the voltage regulator may be supplied to power controller 122. In such embodiments, a multiplexor 130 may be included within the power controller for selectively providing either V$_{IN}$ or V$_{TEMP}$ to the compensation control loop as a feedforward term (VIN_feedforward).

As shown in FIG. 8, the total phase current value (I$_{SUM}$) is supplied to both the digital compensator 132 and the Adaptive Voltage Positioning (AVP) module 134. In addition to I$_{SUM}$, the AVP module 134 receives the VID command, the load line impedance and the digitized output voltage (V$_{OUT}$). The AVP module 134 includes an AVP low pass filter (AVP LPF) 135 for decoding the VID command and generating a target voltage (V$_{TARGET}$), which is based on the total phase current information. In one example, the AVP LPF 135 may generate a target voltage according to:

$$V_{TARGET} = \text{VID} - \text{Load line} \cdot I_{sum}, \quad \text{EQ. 2}$$

Once the target voltage is determined, the AVP module 134 subtracts the digitized output voltage (V$_{OUT}$) from the target voltage (V$_{TARGET}$) to generate an error signal (e), which is supplied to the digital compensator 132.

According to one embodiment, the digital compensator 132 may comprise a proportional-integral-derivative (PID) filter, which implements a PID transfer function for filtering the error signal (e) supplied by the AVP module 134 to produce an output signal, which is supplied to the multi-phase PWM 136 for varying the pulse width and/or the pulse frequency of the PWM signals supplied to the voltage regulator phases 114 (FIG. 2). PID filters are commonly used control loop feedback mechanisms, which continuously calculate an error value as a difference between a measured variable and a desired set-point. A PID filter attempts to minimize the error over time (e(t)) by adjustment of a control variable to a new value (u(t)) determined by a weighted sum of three terms: a proportional term, an integral term and a derivative term. EQ. 3 illustrates one example of time domain PID transfer function:

$$u(t) = K_p e(t) + K_i \int_0^t e(t)dt + K_d \frac{de(t)}{dt} \quad \text{EQ. 3}$$

where e(t) is the error signal at time, t, and corresponds to a difference between a set point and the measured value, K$_p$ is the proportional coefficient term, K$_i$ is the integral coefficient term, and K$_d$ is the derivative coefficient term. In traditional power controllers, the PID filter coefficients (e.g., K$_p$, K$_i$ and K$_d$, as shown in EQ. 3) are constant values and only the error signal and measured value change over time.

Figure 10:
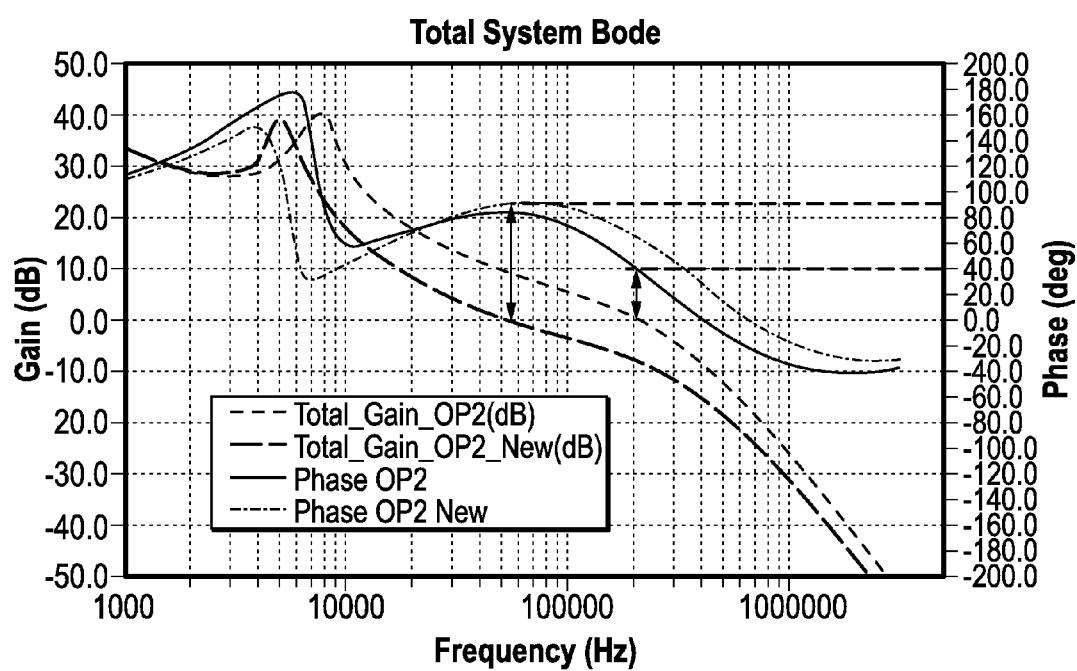
FIG. 10 is a Bode plot illustrating the total system gain for a voltage regulator, which comprises the power controller shown in FIG. 8.

Unlike traditional power controllers, the PID filter 142 implemented within digital compensator 132 compensates for changes in LC output filter characteristics by dynamically adjusting the PID filter coefficients (e.g., K$_P$, K$_I$, K$_D$ and K$_{HPOLE}$, as shown in EQ. 4 below) based on the total phase current value (I$_{SUM}$) supplied to the digital compensator 132 and the current phase count (i.e., the number of currently enabled phases 114). In doing so, the dynamic compensation provided by the digital compensator 132 improves system stability by increasing the phase margin during heavy load conditions, as shown in FIG. 10 and described in more detail below.

EQ. 4 illustrates one example of a PID filter transfer function that may be used within digital compensator 132 for compensating for changes in LC output filter characteristics.

$$H_{PID}(z) = \left[K_P + \frac{K_I}{(1-z^{-1})} + K_D(1-z^{-D})\right]\left(\frac{K_{HPOLE}-1}{K_{HPOLE}-z^{-1}}\right) \quad \text{EQ. 4}$$

In the above equation, $H_{pid}(z)$ is the PID transfer function in the discrete z domain, $K_P$ is the proportional coefficient term, $K_I$ is the integral coefficient term, $K_D$ is the derivative coefficient term, $K_{HPOLE}$ is the high frequency pole term (i.e., the roll off loop gain at high frequency for high frequency noise reduction) and D is a delay term. It is noted that although an exemplary PID filter transfer function is provided above, PID filter 142 is not limited to the transfer function shown in EQ. 4 and may utilize alternative frequency domain or time domain PID transfer functions, in other embodiments of the invention. It is further noted that the PID filter coefficients ($K_P$, $K_I$, $K_D$ and $K_{HPOLE}$) are not constant values, as is typically the case in traditional PID filters. Instead, the coefficients ($K_P$, $K_I$, $K_D$ and $K_{HPOLE}$) of PID filter 142 are dynamically updated based on the total phase current value ($I_{SUM}$) supplied to the digital compensator 132 and the current phase count (i.e., the number of currently enabled phases 114).

In one embodiment, the PID filter coefficients ($K_P$, $K_I$, $K_D$ and $K_{HPOLE}$) may be predetermined through system analysis to provide a desired system response and are stored as a matrix of parameters within memory 144. According to one embodiment, PID filter coefficients ($K_P$, $K_I$, $K_D$ and $K_{HPOLE}$) are selected so as to provide a phase margin above 60 degrees and a loop bandwidth that is approximately ⅕ of the switching frequency. This enables the system to achieve stable operation in both static and dynamic loading conditions, and to respond very fast when there is a transient event. Although illustrated as residing within digital compensator 132, memory 144 may alternatively reside within any location of the power controller 122 that is accessible by digital compensator 132.

Figure 9:
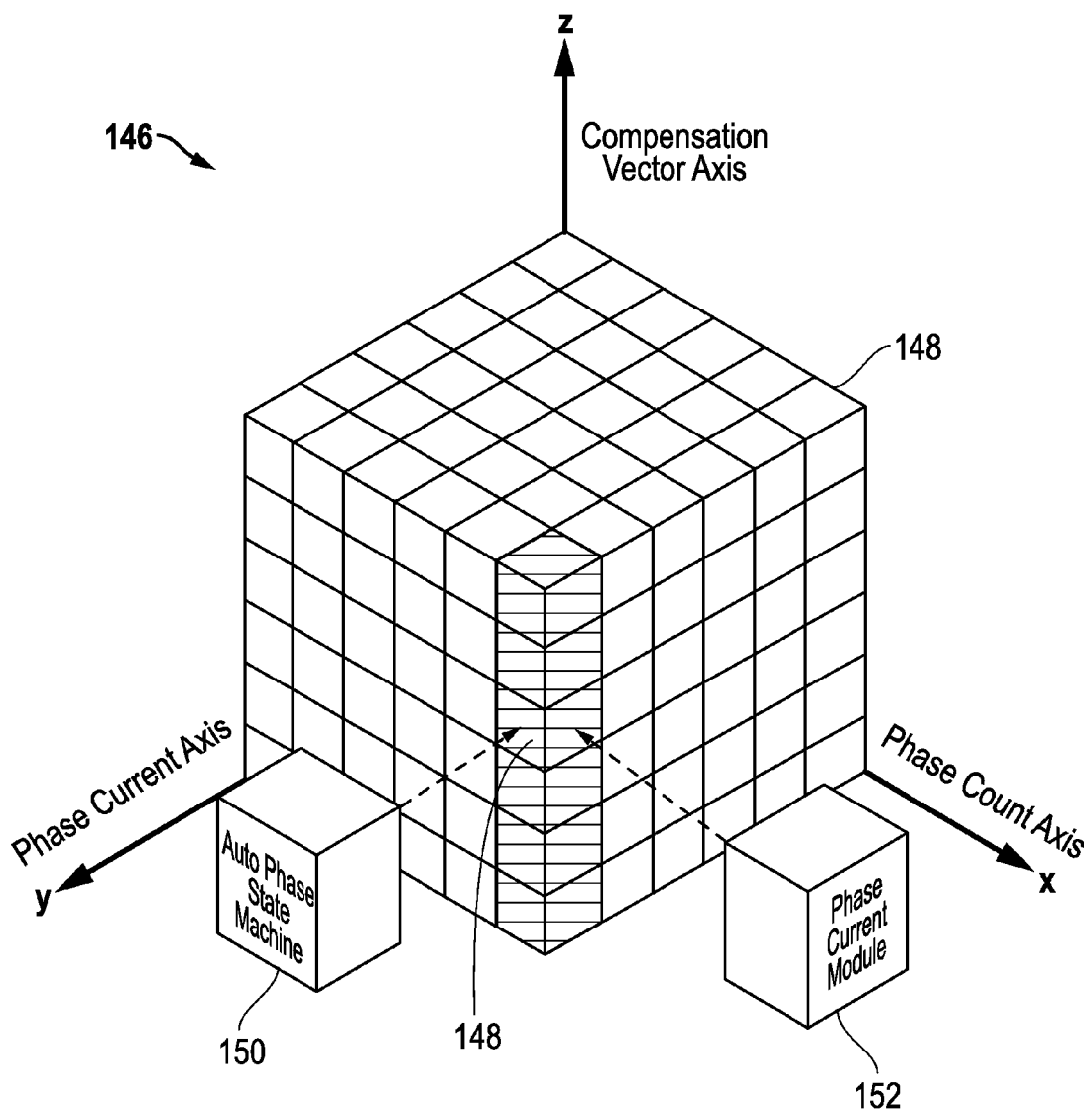
FIG. 9 is a representation of a three dimensional parameter matrix configured for storing sets of PID filter coefficients, which may be used by the power controller of FIG. 8 for compensating for changes in LC output filter characteristics when the inductance of the variable inductors changes with changes in the load current.

FIG. 9 is a representation of one exemplary embodiment of a three dimensional parameter matrix 146 configured storing sets of the PID filter coefficients ($K_P$, $K_I$, $K_D$ and $K_{HPOLE}$) shown, e.g., in EQ. 4. A three-dimensional parameter matrix 146 is illustrated in FIG. 9, since the PID filter coefficient values change with both phase current (y-axis) and phase count (x-axis). In FIG. 9, the phase current axis is segmented with respect to load current, since the inductance value of a variable inductor changes with load current and operating set-point. Each block 148 of the parameter matrix 146 stores one set of PID filter coefficients ($K_P$, $K_I$, $K_D$ and $K_{HPOLE}$). For the phase count axis (x-axis), the stored coefficient values are scaled by the current phase number, since the effective output inductance changes with phase number. The compensation vector axis (z-axis) discretizes the PID filter coefficients by storing each set of PID filter coefficients ($K_P$, $K_I$, $K_D$ and $K_{HPOLE}$) as a function of x and y.

Although illustrated as a three-dimensional matrix in FIG. 9, parameter matrix 146 could be alternatively illustrated and described as one or more two-dimensional look-up tables, which receive phase current and phase count information as inputs and return a corresponding set of PID filter coefficients ($K_P$, $K_I$, $K_D$ and $K_{HPOLE}$). For example, the parameter matrix 146 could be alternatively implemented, as shown in Table 1 below.

TABLE 1

|  | 1Phase | 2phase | 3phase | ... | Nphase |
| --- | --- | --- | --- | --- | --- |
| Current1 | K11 | K12 | K13 | ... | K1N |
| Current2 | K21 | K22 | K23 |  | K2N |
| Current3 | K31 | K32 | K33 |  | K3N |
| Current4 | K41 | K42 | K43 |  | K4N |
| Current5 | K51 | K52 | K53 |  | K5N |
| Current6 | K61 | K62 | K63 |  | K6N |
| ... |  |  | ... |  |  |
| CurrentM | KM1 | KM2 | KM3 |  | KMN |

In Table 1, each K corresponds to a different set of PID filter coefficients ($K_P$, $K_I$, $K_D$ and $K_{HPOLE}$). For instance, K11 corresponds to a set of PID filter coefficients ($K_P$, $K_I$, $K_D$ and $K_{HPOLE}$) that may be used to update PID filter 142 when a minimum phase current ($I_{SUM}$) amount of "Current1" is supplied to the digital compensator 132 and only one of the phases 114 is currently enabled (i.e., the current phase count is "1"). Likewise, KMN corresponds to a set of PID filter coefficients ($K_P$, $K_I$, $K_D$ and $K_{HPOLE}$) that may be used to update PID filter 142 when a maximum phase current ($I_{SUM}$) amount of "CurrentM" is supplied to the digital compensator 132 and all N phases 114 are currently enabled (i.e., the current phase count is "N").

During operation, the PID filter coefficients ($K_P$, $K_I$, $K_D$ and $K_{HPOLE}$) are dynamically determined as a function, f(x,y), where input variable 'x' is the current phase count and input variable 'y' is the total phase current value ($I_{SUM}$). According to one embodiment, the phase count information may be supplied by an auto phase state machine 150 included within the digital compensator 132. The phase current information, on the other hand, may be supplied by a phase current module 152, which uses the total phase current value ($I_{SUM}$) to determine the average phase current per switching cycle. The digital compensator 132 uses the phase count information from auto phase state machine 150 and the phase current information from phase current module 152 as inputs to look up or dynamically determine a corresponding set PID filter coefficients ($K_P$, $K_I$, $K_D$ and $K_{HPOLE}$) stored within a particular block 148 of parameter matrix 146. The dynamically determined PID filter coefficients may then be input to a PID filter transfer function, such as the exemplary transfer function shown in EQ. 4.

According to one embodiment, the dynamically determined PID filter coefficients may be updated into control loop registers in one system clock to optimize the voltage control loop implemented within the digital compensator 132. By dynamically adjusting the PID filter coefficients input to PID filter 142, digital compensator 132 compensates for changing LC filter characteristics when a voltage regulator comprising variable inductors operates in two different load conditions, and more specifically, when transient loads transition past the translational load point from a relatively light load to a heavier load, or vice versa. As shown in the Total System Bode plot of FIG. 10, compensating for changing LC filter characteristics significantly improves the system frequency response by increasing the phase margin in the heavy load range, as shown by the difference in the new Total Gain and Phase plots for operating point 2 (designated as Total_Gain_OP2_New and Phase OP2 New, respectively).

In addition to the control loop compensation described above, power controller 122 may implement additional control loops for regulating the phase currents and dealing with load transients. As shown in FIG. 8, for example, power controller 122 includes a Nonlinear Control block 138, which receives the digitized output voltage ($V_{OUT}$), and in some cases, adds pulses to the output signal supplied to the multiphase PWM 136 by the digital compensator 132 to compensate for rapidly changing loads. A Current Sharing block 140, which is coupled to the multiphase PWM 136, may be included to regulate the digitized phase currents (Iphs_1 . . . Iphs_6) to an average current value ($I_{AVG}$) by slowly changing the pulse width of the PWM signals, so that the phase current is shared equally among the voltage regulator phases 114. The VIN_feedforward term may be used by the digital compensator 132 for generating a duty cycle (Vout/Vin), which can be treated as a scaling term. Other components or blocks not specifically illustrated herein may also be included within the power controller 122 to perform other control functions, as is known in the art.

It will be understood that one or more of the tasks, functions, or methodologies described herein (e.g., including those described for power controller 112 and voltage regulator phases 114) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A voltage regulator, comprising:
   a plurality of voltage regulator phases, coupled to receive a modulated input signal and configured to generate a phase current in response thereto;
   an output filter coupled to the plurality of voltage regulator phases and configured to produce an output voltage for a transient load, wherein the output filter comprises a plurality of variable inductors and at least one capacitor; and
   a power controller coupled to control the modulated input signals supplied to the plurality of voltage regulator phases, wherein the power controller is configured to dynamically adjust a set of coefficients supplied to a transfer function based on a sum of the phase currents generated by the voltage regulator phases and a number of the voltage regulator phases to compensate for changing output filter characteristics when an inductance of the variable inductors changes with changes in the load current.

2. The voltage regulator as recited in claim 1, wherein each voltage regulator phase comprises:
   a power stage comprising a variable inductor having an inductance that changes with changes in load current; and
   a driver stage coupled to drive the power stage based on a modulated input signal supplied to the driver stage;
   wherein each power stage is coupled to generate a respective phase current based on a supply voltage supplied to the power stage and the modulated input signal supplied to a respective driver stage.

3. The voltage regulator as recited in claim 2, wherein each power stage comprises:
   a high-side switch and a low-side switch coupled in series between the supply voltage and ground; and
   the variable inductor, which is coupled in parallel to the high-side switch and the low-side switch to generate the phase current, wherein the phase current boosts or reduces the supply voltage to generate the output voltage.

4. The voltage regulator as recited in claim 1, wherein the power controller is configured for controlling the modulated input signals supplied to the voltage regulator phases based, at least in part, on the phase currents generated by the voltage regulator phases, the number of voltage regulator phases, the output voltage produced by the output filter, and a voltage identification ("VID") command received from the transient load.

5. The voltage regulator as recited in claim 1, wherein the power controller is coupled to receive the output voltage produced by the output filter, a voltage identification ("VID") command received from the transient load, and the sum of the phase currents generated by the voltage regulator phases, and wherein the power controller is configured to decode the VID command, determine a target voltage based on the decoded VID command and the sum of the phase currents, and generate an error signal based on a difference between the output voltage and the target voltage.

6. The voltage regulator as recited in claim 5, wherein the power controller implements the transfer function to filter the error signal and produce an output signal, which is used to adjust at least one of a pulse frequency and a pulse width of the modulated input signals supplied to the voltage regulator phases.

7. The voltage regulator as recited in claim 1, wherein the power controller comprises:
   a proportional-integral-derivative ("PID") filter configured to implement the transfer function; and
   a memory configured for storing a plurality of sets of PID filter coefficients, wherein such sets differ depending on phase current and phase number.

8. The voltage regulator as recited in claim 7, wherein the power controller is configured to retrieve a particular set of PID filter coefficients from the memory based on the sum of the phase currents generated by the voltage regulator phases and the number of the voltage regulator phases, and to input the retrieved set of PID filter coefficients to the transfer function to produce an output signal, which is used to control the modulated input signals supplied to the voltage regulator phases.

9. The voltage regulator as recited in claim 7, wherein the plurality of sets of PID filter coefficients are stored within the memory in a three-dimensional matrix having x, y and z axes, wherein the x axis corresponds to the phase number, the y axis corresponds to the phase current and the z axis is a function of x and y.

10. The voltage regulator as recited in claim 7, wherein the plurality of sets of PID filter coefficients are stored within the memory in a plurality of two-dimensional look-up tables, which receive phase current and phase count information as inputs and return a corresponding set of PID filter coefficients.

11. A method for controlling a voltage regulator comprising a plurality of voltage regulator phases and an output filter, which is coupled to the plurality of the voltage regulator phases and configured to produce an output voltage for a transient load, wherein the output filter comprises a plurality of variable inductors and at least one capacitor, the method comprising:
   supplying a plurality of modulated input signals to the plurality of voltage regulator phases to produce a plurality of phase currents;
   retrieving a set of coefficients from memory based on a sum of the phase currents generated by the voltage regulator phases and a number of the voltage regulator phases;
   implementing a transfer function utilizing the retrieved set of coefficients to generate an output signal; and
   using the output signal to control the modulated input signals supplied to the voltage regulator phases to compensate for changing output filter characteristics when an inductance of the variable inductors changes with changes in load current.

12. The method as recited in claim 11, wherein the step of implementing the transfer function comprises implementing the transfer function as a proportional-integral-derivative ("PID") transfer function comprising the set of coefficients retrieved from memory.

13. The method as recited in claim 11, wherein the step of using the output signal to control the modulated input signals comprises controlling the modulated input signals supplied to the voltage regulator phases based, at least in part, on the phase currents generated by the voltage regulator phases, the number of the voltage regulator phases, the output voltage produced by the output filter and a voltage identification ("VID") command received from the transient load.

14. The method as recited in claim 13, wherein the step of using the output signal to control the modulated input signals further comprises decoding the VID command, determining a target voltage based on the decoded VID command and the sum of the phase currents generated by the voltage regulator phases, and generating an error signal based on a difference between the output voltage and the target voltage.

15. The method as recited in claim 14, wherein the step of implementing the transfer function comprises utilizing the transfer function to filter the error signal to produce the output signal, and wherein the step of using the output signal comprises using the output signal to adjust at least one of a pulse frequency and a pulse width of the modulated input signals supplied to the voltage regulator phases.

16. The method as recited in claim 11, wherein the step of retrieving a set of coefficients comprises:
   retrieving the set of coefficients from memory based on the sum of the phase currents generated by the voltage regulator phases and the number of the voltage regulator phases, wherein a plurality of sets of the coefficients are predetermined and stored within the memory, and wherein such sets differ depending on phase current and phase number; and
   inputting the retrieved set of coefficients to the transfer function to generate the output signal.

17. An information handling system, comprising:
   at least one information handling resource operable for producing a transient load; and
   at least one voltage regulator coupled to the at least one information handling resource for producing an output voltage for supplying the transient load, wherein the at least one voltage regulator comprises:
      a plurality of voltage regulator phases, each coupled to receive a modulated input signal and configured to generate a phase current in response thereto;
      an output filter coupled to the plurality of the voltage regulator phases and configured to produce an output voltage for a transient load, wherein the output filter comprises a plurality of variable inductors and at least one capacitor; and
      a power controller coupled for controlling the modulated input signals supplied to the plurality of voltage regulator phases, wherein the power controller is configured to dynamically adjust a set of coefficients supplied to a transfer function based on a sum of the phase currents generated by the voltage regulator phases and a number of voltage regulator phases to compensate for changing output filter characteristics when an inductance of the variable inductors changes with changes in the load current.

18. The information handling system as recited in claim 17, wherein the power controller is coupled to receive the output voltage, a voltage identification ("VID") command from at least one information handling resource, and the sum of the phase currents generated by the voltage regulator phases, and wherein the power controller is configured to decode the VID command, determine a target voltage based on the decoded VID command and the sum of the phase currents, and generate an error signal based on a difference between the output voltage and the target voltage.

19. The information handling system as recited in claim 18, wherein the power controller is configured to implement the transfer function to filter the error signal and produce an output signal, which is used to adjust at least one of a pulse frequency and a pulse width of the modulated input signals supplied to the voltage regulator phases.

20. The information handling system as recited in claim 17, wherein the power controller comprises:
   a proportional-integral-derivative ("PID") filter configured to implement the transfer function; and a memory configured for storing a plurality of sets of PID filter coefficients, wherein such sets differ depending on phase current and phase number.

21. The information handling system as recited in claim 20, wherein the power controller is configured to retrieve a particular set of PID filter coefficients from the memory based on the sum of the phase currents generated by the voltage regulator phases and the number of the voltage regulator phases, and to input the retrieved set of PID filter coefficients to the transfer function to produce an output signal, which is used to adjust at least one of a pulse frequency and a pulse width of the modulated input signals supplied to the voltage regulator phases.

* * * * *